UNITED STATES PATENT OFFICE.

AUGUST J. SPIELER, OF CELINA, OHIO.

METHOD OF PREPARING CATALYZERS.

1,139,592.  Specification of Letters Patent.  Patented May 18, 1915.

No Drawing.  Application filed March 22, 1913.  Serial No. 756,134.

*To all whom it may concern:*

Be it known that I, AUGUST J. SPIELER, a citizen of the United States, residing at Celina, in the county of Mercer and State of Ohio, have invented certain new and useful Improvements in Methods of Preparing Catalyzers; and I do declare the following to be a full, clear, and exact description of the invention, such as will enable others skilled in the art to which it appertains to make and use the same.

This invention relates to new and useful improvements in catalyzers adapted to convert unsaturated fats and oils and fatty esters into saturated compounds of higher melting point. The invention also relates to the method of preparing the catalyzer.

The object of the invention is to produce a catalyzer of a uniform and high degree of activity and stability, one that can be easily prepared, and after preparation be conveniently handled and transported from place to place, as an article of mechandise without any appreciable deterioration or loss in its catalytic activity.

It is known that the reduction of unsaturated fats and oils can be accomplished by allowing hydrogen to act upon them in such condition in the presence of finely divided metallic nickel, or upon metallic nickel which has been deposited upon finely divided inert substances. These metallic powders, or metalized powders, when reduced at a proper temperature in an atmosphere of hydrogen, derived from another source, have the property of carrying free hydrogen, and under suitable conditions can effect the saturation with hydrogen of unsaturated fats and oils. The nature of such, so prepared, catalyzers makes it necessary to freshly reduce them immediately before use, and from the time of their reduction until they are introduced into the fats or oils to be treated or saturated, they must be kept in an atmosphere of hydrogen or other inert gases, as any exposure to the air of these catalyzers will at once impair their activity to a great extent, if not completely destroy it.

I have found that gelatinous aluminum hydrate, also gelatinous silicon hydrate possess catalytic properties in a slight degree, not sufficiently marked to be of value as a commercial catalyst when used by themselves, however, when in contact or in combination with nickel salts the catalytic properties of these hydrates are remarkably increased, so much that such a compound or combination has far greater catalytic activity than either of the component ingredients themselves.

I have found that when a nickel salt of an organic acid, such as nickel formate and nickel carbonate, is intimately incorporated with a preponderating quantity of inorganic colloids, such as gelatinous aluminum hydrate or gelatinous silicon hydrate, either singly or together, in the dry state, or with a sufficiency of water to form a pasty mass, and this heated with an appropriate quantity of fat or oil, or any other suitable suspension medium, to a temperature approximately 230 to 250° C. in a pressure vessel suitably arranged to agitate the contents, a catalyzer of uniform activity and stability can always be produced.

In the process of preparing this catalytic compound, in the event the chemical ingredients are in the form of a pasty mass, during the stage of the evaporation of the water of the solution, and the subsequent heating to the final temperature, a constant brisk agitation of the entire mass is desirable, as by this procedure the entire catalytic substance is finely and uniformly distributed throughout the suspension medium, each particle of the catalytic substance being inclosed by a covering of the suspension medium.

During the stage of evaporation of the water of solution, some intermediate reactions may occur between the nickel formate or carbonate and the inorganic colloids, however, the final decomposition of the nickel formate may be expressed by the equation

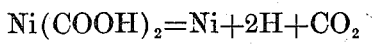

$$Ni(COOH)_2 = Ni + 2H + CO_2$$

and that of the nickel carbonate as

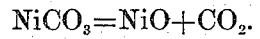

$$NiCO_3 = NiO + CO_2.$$

The hydrogen liberated during the decomposition of the formate is in the nascent state and within the covered particles is at once absorbed or held by the catalyzer, which is then fully charged with the hydrogen content it is capable of occluding. In this manner the catalyzer is preserved in its most potent state.

There are various ways possible of preparing this catalyst through which the same results may be obtained. I herewith describe two methods of procedure which can be easily carried out.

A convenient method of preparing this catalyzer is to take 40 parts of nickel formate and carbonate in aqueous suspension and thoroughly incorporate this with about 80 parts of gelatinous aluminum hydrate or gelatinous silicon hydrate, either singly or together, in any proportion. The proportion of nickel formate and carbonate may be varied considerably. The proportion may be as low as four parts of one to thirty-six parts of the other and obtain satisfactory results. Place this in a suitable agitating vessel with 100 parts of a suitable suspensory medium. Heat the whole mass with constant agitation. The steam resulting from the evaporation of the aqueous solution is allowed to escape. When the escape of steam ceases, the temperature is raised to approximately 235–250° C. and the temperature maintained until the reaction is complete.

Another method is to take nickel formate and carbonate, and air dried gelatinous aluminum hydrate or silicon hydrate, or both together, in any proportion, thoroughly incorporate these together and put in a pressure vessel with an appropriate quantity of fat or oil, or other suitable suspensory medium, agitate and heat the mass to a temperature of approximately 235–250° C. until the reaction is complete.

It is understood that I do not limit myself to any particular proportions, as between the nickel salts and the inorganic gelatinous hydrates, nor to the proportions of fats or oils or other suitable suspensory medium employed. However, the proportion of 4 parts of nickel formate and carbonate and 8 parts of the inorganic gelatinous hydrates proved to make a very effective and stable catalyst for the hydrogenation of fats and oils.

What I claim is:

1. The method of preparing a catalyst herein described which consists in incorporating a colloid of aluminum and silicon with an organic salt of nickel, and in subjecting the same to decomposition by heat.

2. The herein described method of preparing a catalyst which consists in incorporating a colloid of aluminum and silicon with salts of nickel decomposable by heat alone at a comparatively low temperature when under the influence of heat below the temperature of decomposition of the nickel salts.

3. The herein described method of preparing a catalyst which consists in incorporating a colloid of aluminum and silicon with salts of nickel decomposable by heat alone at a comparatively low temperature and decomposing the salts by the aid of heat.

4. The herein described method of preparing a catalyst which consists in incorporating a colloid of aluminum and silicon with salts of nickel decomposable by heat alone at a comparatively low temperature when suspended in a medium of an oleaginous substance, which is a fluid and non-volatile at the temperature necessary to decompose the salts.

5. The herein described method of preparing a catalyst which consists in incorporating a colloid of aluminum and silicon with salts of nickel decomposable by heat alone at a comparatively low temperature when suspended in a medium of an oleaginous substance which is fluid and non-volatile at the temperature necessary to decompose the salts, and decomposing the salts by the aid of heat.

6. The herein described method of preparing a catalyst which consists in agitating a colloid of aluminum and silicon and salts of nickel decomposable by heat alone at a comparatively low temperature in a medium of an oleaginous substance which is fluid and non-volatile at the temperature necessary to decompose the salts, and decomposing the salts by the aid of heat.

7. The herein described method of preparing a catalyst which consists in agitating a colloid of aluminum and silicon and salts of nickel decomposable by heat alone at a comparatively low temperature in an oleaginous substance which is in a fluid state and non-volatile at the temperature necessary to decompose the salts, and decomposing them by the aid of heat.

8. The herein described method of preparing a catalyst which consists of agitating a hydrate of aluminum and silicon with salts of nickel decomposable by heat alone at a comparatively low temperature in a medium of an oleaginous substance which is in a fluid state and non-volatile at the temperature necessary to decompose the salts, and decomposing the salts by the aid of heat.

9. The herein described method of preparing a catalyst which consists in agitating a hydrate of aluminum and silicon with salts of nickel decomposable by heat alone at a comparatively low temperature in an oleaginous substance which is in a fluid state and non-volatile at the temperature necessary to decompose the salts, in decomposing the salts by the aid of heat thereby charging the catalytic substance formed with free hydrogen.

10. The method of preparing a catalyst which consists in agitating a hydrate of aluminum and silicon with salts of nickel decomposable by heat alone at a comparatively low temperature in an oleaginous substance which is a fluid and non-volatile at the temperature necessary to decompose the salts, in decomposing the salts by the aid of heat thereby charging the catalytic substance with free hydrogen.

11. The method of preparing a catalyst which consists of agitating a hydrate of aluminum and silicon, with salts of nickel decomposable by heat alone at a comparatively low temperature in an oleaginous substance which is a fluid and non-volatile at the temperature necessary to decompose the salts, in decomposing the salts by the aid of heat thereby charging the catalytic substance with free hydrogen.

In testimony whereof I affix my signature in presence of two witnesses.

AUGUST J. SPIELER.

Witnesses:
GEORGE F. PULSKAMP,
REUBEN J. SACHER.